United States Patent
Nakata et al.

(10) Patent No.: US 7,719,648 B2
(45) Date of Patent: May 18, 2010

(54) MANUFACTURING APPARATUS FOR LIQUID CRYSTAL DEVICE, MANUFACTURING METHOD FOR LIQUID CRYSTAL DEVICE, LIQUID CRYSTAL DEVICE AND ELECTRONIC DEVICE

(75) Inventors: Hideo Nakata, Suwa (JP); Takeshi Miyashita, Suwa (JP)

(73) Assignee: Seiko Epson Corporation (JP)

( * ) Notice: Subject to any disclaimer, the term of this patent is extended or adjusted under 35 U.S.C. 154(b) by 535 days.

(21) Appl. No.: 11/485,552

(22) Filed: Jul. 12, 2006

(65) Prior Publication Data

US 2007/0014935 A1 Jan. 18, 2007
US 2007/0104893 A9 May 10, 2007

(30) Foreign Application Priority Data

Jul. 14, 2005 (JP) ............................. 2005-205467

(51) Int. Cl.
*G02F 1/1337* (2006.01)
*B01D 1/22* (2006.01)
*C23C 16/00* (2006.01)

(52) U.S. Cl. ................. 349/125; 349/123; 349/124; 159/7; 159/9.1; 118/720

(58) Field of Classification Search ......... 349/123–125; 159/7, 9.1; 118/720
See application file for complete search history.

(56) References Cited

U.S. PATENT DOCUMENTS 4,416,216 A * 11/1983 Nakamura et al. .......... 118/696
6,558,822 B2 5/2003 Nagasaka et al.
2003/0180464 A1* 9/2003 Ohkouchi et al. ........... 427/314
2005/0229856 A1* 10/2005 Malik ......................... 118/726
2006/0270243 A1* 11/2006 Chang et al. ................ 438/758

FOREIGN PATENT DOCUMENTS

| JP | 55-032040 | 3/1980 |
| JP | GB1603905 | * 12/1981 |
| JP | 2002-277879 | 9/2002 |
| JP | 2002-365639 | 12/2002 |
| JP | 2003-138369 | 5/2003 |
| JP | 2005-077900 | 3/2005 |
| JP | 2005-077901 | 3/2005 |
| JP | 2005-084586 | 3/2005 |
| KR | 10-0284660 | 12/2000 |
| KR | 2001-0107746 | 12/2001 |

* cited by examiner

*Primary Examiner*—Frank G Font
*Assistant Examiner*—Robert Tavlykaev
(74) *Attorney, Agent, or Firm*—Harness, Dickey & Pierce, P.L.C.

(57) ABSTRACT

A manufacturing apparatus for a liquid crystal device having a pair of substrates facing each other, an oriented film formed on an facing surface of at least one substrate in the pair of the substrates, and a liquid crystal held between the pair of substrates, includes: a film formation chamber; an evaporating section having an evaporation source, evaporating an inorganic material on the substrate in the film formation chamber by a physical vapor deposition, and forming an oriented film and a base film arranged under the oriented film; a base film formation area forming the base film and located substantially above the evaporation source in the film formation chamber; and an oriented film formation area located obliquely above the evaporation source in the film formation chamber, forming the oriented film and having a shielding plate having an elongated opening for selectively evaporating an inorganic material.

1 Claim, 8 Drawing Sheets

MANUFACTURING APPARATUS FOR LIQUID CRYSTAL DEVICE, MANUFACTURING METHOD FOR LIQUID CRYSTAL DEVICE, LIQUID CRYSTAL DEVICE AND ELECTRONIC DEVICE

CROSS-REFERENCE TO RELATED APPLICATION

This application claims priority on Japanese Patent Application No. 2005-205467, filed Jul. 14, 2005, the contents of which are incorporated herein by reference.

BACKGROUND

1. Technical Field

The present invention relates to a manufacturing apparatus for a liquid crystal device, a manufacturing method for a liquid crystal device, a liquid crystal device and electronic device.

2. Related Art

A liquid crystal device has been used as a photo-modulation section in a projection display device such as a liquid crystal projector, etc.

Such a liquid crystal device includes a sealant arranged at the periphery between a pair of substrates and a liquid crystal layer sealed at its center.

Electrodes for applying a voltage to the liquid crystal layer are formed on the side of an inner surface of the pair of substrates, and an oriented film for controlling the orientation of liquid crystal molecules when applying a non-selective voltage is formed on the side of the inner surface of the electrodes.

By such a constitution, the liquid crystal device modulates the light of a light source based on the orientation change of the liquid crystal molecules when applying a non-selective voltage or selective voltage to form the light of an image.

An oriented film subjected to a rubbing treatment is generally used as the above-mentioned oriented film on the surface of a polymer film made of polyimides to which a side-chain alkyl group, etc, has been added.

The rubbing treatment section of a polymer is oriented in a pre-determined direction by rubbing the surface of a polymer film in a pre-determined direction with a roller having a soft cloth.

Liquid crystal molecules are arranged along an orienting high polymer due to an intermolecular interaction between the orienting high molecules and the liquid crystal molecules.

Therefore, liquid crystal molecules can be oriented in a pre-determined direction when a non-selective voltage is applied.

A pre-tilt can be given to a liquid crystal molecule by a side-chain alkyl group.

However, when a liquid crystal device fitted with such an organic oriented film is adopted as the photo-modulation section of a projector, there is concern that the oriented film will gradually degrade due to strong light radiated from a light source or heat.

There is further concern that the orientation control function of liquid crystal molecules is reduced and the display quality of the liquid crystal projector will deteriorate after extended use, e.g., the liquid crystal molecules cannot be arrayed at a desired pre-tilt angle.

Accordingly, as disclosed in Japanese Unexamined Patent Application, First Publication No. 2002-277879, the use of an oriented film made of an inorganic material excellent in light resistance and heat resistance has been proposed.

As a manufacturing method for such an inorganic oriented film, for example, a silicon oxide ($SiO_2$) film formed by an oblique evaporation process is known.

The technique of Japanese Unexamined Patent Application, First Publication No. 2002-277879 overcomes the technical problem in that, if an inorganic material is obliquely deposited as it is, especially when a stepped portion is formed at the under portion of an oriented film due to pixel electrode wiring, etc., poor evaporation areas (evaporation irregularities or no evaporation) of inorganic material form in the vicinity of the stepped portion.

In the technique of Japanese Unexamined Patent Application, First Publication No. 2002-277879, especially a first obliquely inorganic evaporated film and a second obliquely inorganic evaporated film are formed while azimuth directions are differed from each other.

When an inorganic oriented film is formed by the oblique evaporation process, it is necessary to control the incidence angle of an oriented film material to form the oriented film in a desired oriented state.

As a technique for controlling the incidence angle of an orientation material, Japanese Unexamined Patent Application, First Publication No. 2002-365639 is known.

According to this technique, a shielding plate having a slit is arranged between an oriented film material and a substrate, through which a desired oriented film is formed by selective evaporation at a pre-determined incidence angle.

In addition to the technique shown in Japanese Unexamined Patent Application, First Publication No. 2002-277879, for example, it is also considered that a base film that also serves as a flattening layer is formed as an under portion of an oriented film, by which a stepped portion is eliminated to some extent. An inorganic film is then formed thereon in order to solve the technical problem caused by the formation of a stepped portion in the under portion of the oriented film as described above.

However, when the base film that also serves as a flattening layer is formed, it is necessary to separately prepare an apparatus for the forming of the base film and an apparatus for the forming of the oriented film, creating the new problem of increasing apparatus cost.

In the technique described in Japanese Unexamined Patent Application, First Publication No. 2002-365639, the forming of the oriented film includes controlling the incidence angle of the oriented film by passing the material of the oriented film sublimated from an evaporation source through the slit of the shielding plate so as to flow only part of the material at a pre-determined angle.

Therefore, in the forming of the oriented film, other part of sublimated material which does not pass through the slit of the shielding plate is wasted.

There is a problem in that the usage efficiency of material is poor.

SUMMARY

An advantage of some aspects of the invention is to provide a manufacturing apparatus for a liquid crystal device, a manufacturing method for a liquid crystal device, a liquid crystal device and electronic device which solve technical problems caused by the formation of a stepped portion on the under portion of the oriented film, and which improve the usage efficiency of material when forming an inorganic oriented film by oblique evaporation.

A first aspect of the invention provides a manufacturing apparatus for a liquid crystal device having a pair of substrates facing each other, an oriented film formed on an facing surface of at least one substrate in the pair of the substrates, and a liquid crystal held between the pair of substrates, including: a film formation chamber; an evaporating section having an evaporation source, evaporating an inorganic material on the substrate in the film formation chamber by a physical vapor deposition, and forming an oriented film and a base film arranged under the oriented film; a base film formation area forming the base film and located substantially above the evaporation source in the film formation chamber; and an oriented film formation area located obliquely above the evaporation source in the film formation chamber, forming the oriented film, and having a shielding plate having an elongated opening for selectively evaporating an inorganic material.

In this manufacturing apparatus for the liquid crystal device, it is possible to carry out parallel forming of the base film and forming of the oriented film by the same evaporating section for the substrates differed from each other, because the manufacturing apparatus has a base film formation area and the oriented film formation area in the same film formation chamber.

Furthermore, it is possible to suppress the formation of a stepped portion on the base potion of the oriented film by forming the base film, and to eliminate the need to separately prepare an apparatus for the forming of a base film and another apparatus for the forming of an oriented film. Thereby, it is possible to reduce apparatus cost.

Furthermore, since the forming of the base film and the forming of the oriented film are performed in a parallel process by the same evaporating section, it is possible to reduce the wastefulness of materials sublimated from the evaporation source and to increase the usage efficiency of material.

It is preferable that, in the manufacturing apparatus of the first aspect of the invention, the film formation chamber include a selectively evaporating section for selectively scattering an evaporant only at the side of base film formation area in the film formation chamber.

It is possible to increase in the film forming rate of the base film relative to the film forming rate of the oriented film. By this means, the film thickness of the base film can be fully thickened to enhance its function as a flattening film.

It is preferable that, in the manufacturing apparatus of the first aspect of the invention, the film formation chamber have a transporting section holding and transporting the substrate, and the transporting section has an elevating mechanism for elevating or lowering the substrates while holding the substrates.

In this manner, it is possible to increase the film forming rate of the base film by lowering the substrate especially at the side of base film formation area in the film formation chamber by the elevating mechanism and to narrow the distance from the evaporation source.

Accordingly, the film thickness of the base film can be fully thickened to enhance its function as a flattening film.

It is preferable that, in the manufacturing apparatus of the first aspect of the invention, the film formation chamber have a transporting section holding and transporting the substrate, and the transporting section has a rotating mechanism for rotating the substrates while holding the substrates.

In this manner, irregularities of thickness and quality of the formed base film can be eliminated by rotating the substrate especially at the side of the base film formation area in the film formation chamber by the rotating mechanism.

A second aspect of the invention provides a manufacturing method, including: preparing a pair of substrates; forming a base film on at least one substrate in the pair of the substrates; forming an oriented film on the base film; applying a liquid crystal onto the oriented film; and making the pair of substrates to face each other so that the oriented film is disposed therebetween, and the liquid crystal is held therebetween, the forming of at least a part of the base film on one substrate and the forming of the oriented film on another substrate are performed in parallel process by a same evaporating section in a film formation chamber.

In this manufacturing method for the liquid crystal device, it is possible to eliminate the need to separately prepare apparatus for the forming of the base film and apparatus for the forming of the oriented film, and to reduce the apparatus cost, because the forming of at least a part of the base film onto one substrate and the forming of the oriented film onto another substrate are carried out in parallel by the same evaporating section in the same film formation chamber.

Moreover, it is possible to suppress the formation of a stepped portion at the under portion of the oriented film and to solve the technical problem caused by this stepped portion by especially forming the base film.

Furthermore, it is possible to eliminate the wastefulness of material sublimated from the evaporation source, because the forming of the base film and the forming of the oriented film are carried out in parallel by the same evaporating section.

It is preferable that, in the manufacturing method of the second aspect of the invention, the forming of the base film include: forming the base film by the evaporating section as the same evaporation forming the oriented film; and forming the base film by the evaporating section differed from the evaporation forming the oriented film.

In this a manner, the film forming rate of the base film can be increased relative to the film forming rate of the oriented film. By this means, the thickness of the base film can be fully thickened to enhance its function as a flattening film.

It is preferable that, in the manufacturing method of the second aspect of the invention, the base film be formed on the substrate while rotating the substrate.

In this a manner, irregularities in the thickness and quality of the resultant base film can be eliminated because the base film is formed while rotating the substrate.

A third aspect of the invention provides a liquid crystal device, which is manufactured by the above-described manufacturing apparatus or by the above-described manufacturing method.

In the liquid crystal device, it is possible to reduce the manufacturing costs because the apparatus cost is reduced and the usage efficiency of the material is further increased as described above.

Furthermore, it is possible to solve the technical problems caused by the formation of a stepped portion at the under portion of the oriented film, thereby improving quality.

A fourth aspect of the invention provides an electronic device including the above-described liquid crystal device.

In this manner, it is possible to reduce the manufacturing costs and to improve quality in the electronic device, because the electronic device is provided with a liquid crystal device which enables a reduction in manufacturing costs and improvement in quality.

DESCRIPTION OF EXEMPLARY EMBODIMENTS

The invention is described in detail hereafter, with reference to the drawings below.

Figure 1:
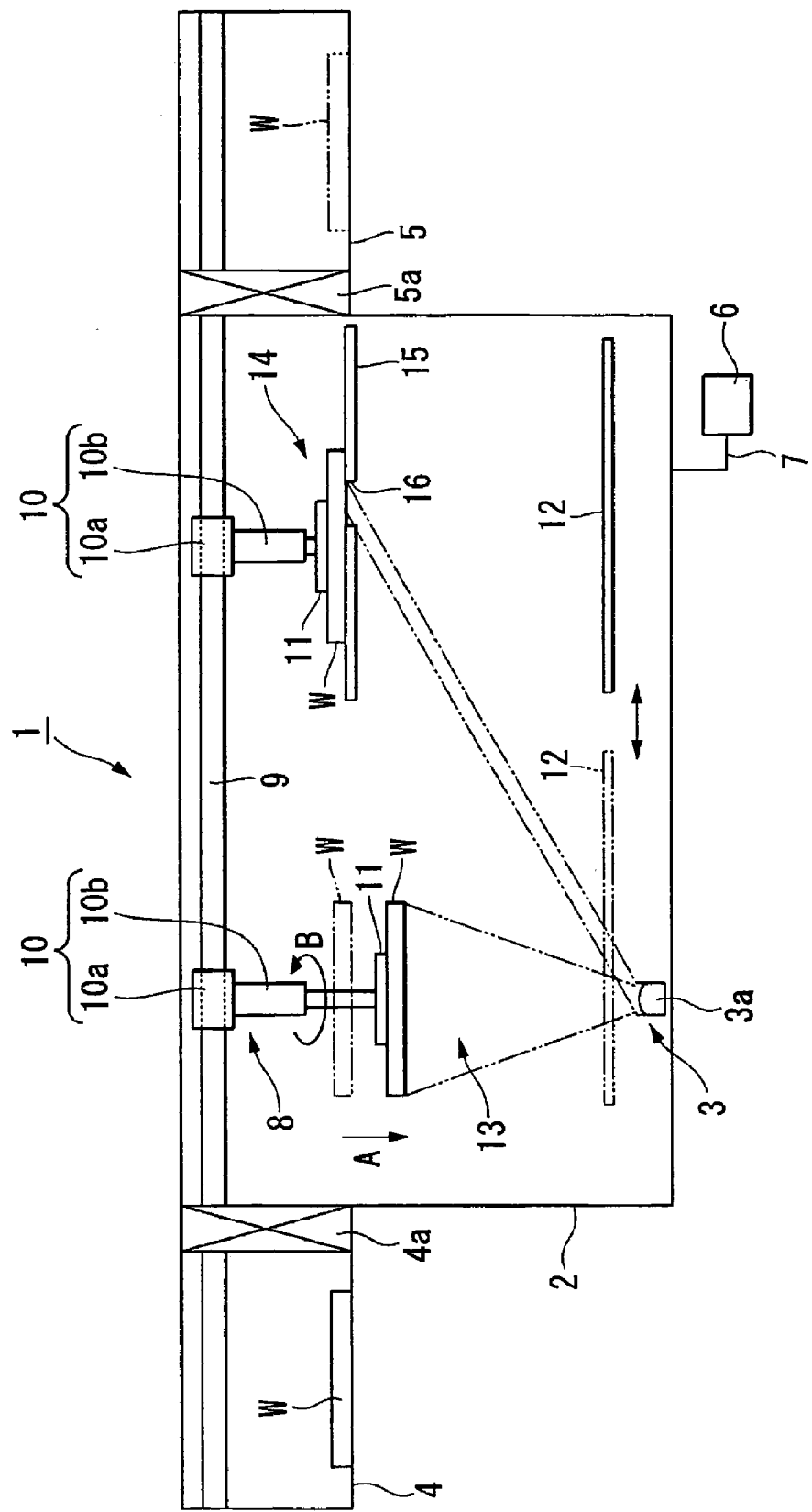
FIG. 1 is a schematic block diagram of an embodiment of the manufacturing apparatus of this invention.

FIG. 1 is a schematic block diagram of an embodiment of the manufacturing apparatus for the liquid crystal device of this invention.

In FIG. 1, reference numeral 1 represents a manufacturing apparatus for a liquid crystal device (hereafter referred to as manufacturing apparatus).

The manufacturing apparatus 1 forms a base film and an oriented film made of the same inorganic material on the surface of a substrate W constituting a constituent member of the liquid crystal device.

The manufacturing apparatus 1 is provided by having a film formation chamber 2 constituted as a vacuum chamber and an evaporating section 3 for sublimating an inorganic material.

The base film and oriented film material is made of the inorganic material sublimated from the evaporating section 3.

The film formation chamber 2 communicates, at an upper portion thereof, with a pre-processing chamber 4 from which the substrate W is loaded into the film formation chamber 2 and with a post-processing chamber 5 into which the substrate W that has been undergone a vapor deposition process in the film formation chamber 2 is transferred.

The substrates W from which the substrate W is loaded is carried from the pre-processing chamber 4 into the film formation chamber 2. The substrates W on which a vapor deposition process has been undergone is transferred from the film formation chamber 2 to the post-processing chamber 5.

A vacuum pump 6 for controlling the inner pressure to obtain a desired vacuum is connected to the film formation chamber 2 via a pipe 7.

Similarly, a vacuum pump (not shown) for independently regulating the pre-processing chamber 4 and the post-processing chamber 5 to a vacuum is connected to the chambers.

A gate valve 4a tightly isolating the film formation chamber 2 from the pre-processing chamber 4 is provided between the chambers.

A gate valve 5a tightly isolating the film formation chamber 2 from the post-processing chamber 5 is provided between the chambers.

Such a constitution, it is possible to carry in the substrates W from the pre-processing chamber 4 to the film formation chamber 2, and is possible to carry out the substrates W from the film formation chamber 2 to the post-processing chamber 5, without greatly lowering the vacuum in the film formation chamber 2.

A transporting section 8 is provided in the film formation chamber 2.

The transporting section 8 carries in the substrates W from the pre-processing chamber 4 to the film formation chamber 2, carries the substrates W in the film formation chamber 2 continuously or intermittently, and subsequently carries out the substrates W on which the vapor deposition process has been undergone from the film formation chamber 2 to the post-processing chamber 5.

The transporting section 8 includes a rail 9 extending from the pre-processing chamber 4 to the post-processing chamber 5 through the film formation chamber 2, two holding arms 10 movably suspended on the rail 9 and holding members 11 provided at the lower end of the holding arms 10 to hold the substrates W.

The holding arms 10 are constructed by suspension parts 10a movably mounted to the rail 9 by having gears and arms 10b extending downward from the suspension parts 10a.

The holding arms 10 are constructed so as to control operations such as movement, etc. from the outside by a control unit (not shown).

The gears and the arms 10b are constructed so that a plurality of tubular rods can be inserted through each other and can thereby be extended or contracted downward.

The gears and the arms 10b are rotatably mounted to the suspension parts 10a and rotate in the base film formation area by a mechanism such as a rack and pinion or a rotating mechanism based on a motor, etc. as described later.

The rotating mechanism may be provided between the rods constructing the gears and the arms 10b.

The holding members 11 removably hold the substrates W by an adsorption mechanism based on an electrostatic chuck or a mechanism supporting the periphery of substrates W on the bottom surface side, while film formation areas of the bottom of the substrates W are exposed.

The holding members 11 are constructed by electrostatic chucks in this embodiment.

On the basis of such a construction, the transporting section 8 carries in the substrates W from the pre-processing chamber 4 to the film formation chamber 2, carries the substrates W in the film formation chamber 2 continuously or intermittently, and subsequently carries out the substrates W on which the vapor deposition process has been undergone from the film formation chamber 2 to the post-processing chamber 5 by traveling (moving) the suspension parts 10a on the rail 9, while the substrates W are held by the holding members 11.

The substrate W can be elevated or lowered by constructing the gears and the arms 10b in a downwardly extensible manner while the substrates W are held by the holding members 11.

Therefore, an elevating mechanism in this invention is constructed by making the gears and the arms 10b extendable.

The substrates W can be rotated by the rotating mechanism while the substrates W are held by the holding members 11.

Such elevating/lowering and rotation of substrates W are also controlled by the control unit (not shown).

The evaporating section 3 is arranged at the bottom of the film formation chamber 2 and at the side of the pre-processing chamber 4 in the film formation chamber 2.

The evaporating section 3 evaporates inorganic material, which becomes the base film material and the oriented film material on the substrates W by a physical vapor deposition process, i.e., an evaporation process or a sputtering process such as an ion beam sputtering process, etc. to form the base film and the oriented film.

In the embodiment, the evaporating section 3 is constructed by an evaporation source 3a made of the inorganic material and an electron beam gun unit (not shown) which radiates an electron beam on the evaporation source 3a to heat and sublimate the inorganic material.

As heating types of the evaporation source 3a in place of the electron beam gun unit, a resistance heating type heater may be used.

$SiO_x$ (such as silicon dioxide ($SiO_2$), etc.) used as the inorganic material becomes the base film material and the oriented film material in this embodiment.

In the evaporating section 3, the opening of a crucible holding the evaporation source 3a is arranged upward, thereby the evaporating section 3 sublimates evaporant of the inorganic material to radially exit upward.

A shutter 12 openably/closably covering the evaporation source 3a is provided in the evaporating section 3.

The shutter 12 is connected to a forward/backward mechanism (not shown) and can be moved between a state of opening the evaporation source 3a (a state shown by a solid line in FIG. 1) and a state of covering the evaporation source 3a (a state shown by a double chain line in FIG. 1) in this embodiment.

On the basis of such a constitution, the shutter 12 can stop the forming of film on the substrates W until the sublimation rate of the evaporation source 3a stabilizes by covering the evaporation source 3a, especially in the initial stage of sublimation of an orientation material, as described later.

In the film formation chamber 2, the substantially above of evaporation source 3a, i.e., the overhead and its surrounding of the evaporation source 3a is a base film formation area 13 in this invention. The above oblique evaporation source 3a, i.e., the side of the post-processing chamber 5 in the film formation chamber 2 is an oriented film formation area 14 in this invention.

Since the base film formation area 13 is located at the overhead part of the evaporation source 3a as described above, the distance from the evaporation source 3a to the substrate W is shorter than that the distance from the evaporation source 3a to the oriented film formation area 14 located at the oblique upper of the evaporation source 3a.

Accordingly, in the base film formation area 13, the degree of diffusion of sublimated inorganic material from the evaporation source 3a is low, and the concentration of sublimated inorganic material is relatively high.

Therefore, generally, the film forming rate in the evaporation process is said to be inversely proportional to the square of the distance.

Accordingly, the film forming rate of inorganic material in the base film formation area 13 is higher than that of the oriented film formation area 14.

The elevating mechanism and the rotating mechanism operate in the base film formation area 13.

Therefore, the gears and the arms 10b of holding arm 10 extend downward, and the substrate W held by the holding member 11 is lowered as shown by arrow A in FIG. 1.

Moreover, the holding arm 110 is rotated in the direction of the arrow B (or its reverse direction) and, for example, the substrate W is rotated for about one rotation or two rotations while the substrate W is passed through the base film formation area 13.

Furthermore, a shielding plate 15 is arranged and supported by a support member (not shown) in the oriented film formation area 14.

The shielding plate 15 is made of a metal or ceramic, resin, etc.

An elongated opening 16 is formed on the shielding plate for selectively evaporating the inorganic material sublimated from the evaporation source 3a to the substrate W.

The opening 16 is located perpendicular to the carrying direction of the substrate W (longitudinal direction of rail 9) by properly arranging the shielding plate 15, 25 and selectively evaporates the inorganic material (evaporant) sublimated from the evaporation source 3a to the substrate W.

Since the shielding plate 15 is arranged in the oriented film formation area 14 located at the oblique upper of the evaporation source 3a, the opening 16 sets an angle between the surface of the substrate W exposed by the opening 16 and a sublimating direction extended from the evaporation source 3a to the opening 16, to a pre-determined range.

Hence, the sublimate (evaporant) of inorganic material is obliquely evaporated at a pre-determined angle to the film forming surface of the substrate W.

On the other hand, the shielding plate 15 covers a non-oriented film formation area other than the film formation area prescribed by the opening 16 by covering the bottom surface side of the substrate W.

The shielding plate 15 prevents the inorganic material from evaporation to the non-oriented film formation area.

However, since the substrate W moves to the opening 16, the inorganic material can be obliquely evaporated over the film formation area by facing the entire film formation area (oriented film formation area) of the substrate W to the opening 16 while staggering the time.

An adherent resistant plate (not shown) for preventing the oriented film material from adhering to the inner wall of the film formation chamber 2 is attachably/detachably arranged in the film formation chamber 2.

Next, an example of the manufacturing method for this invention is described based on a manufacturing method for the base film and the oriented film by the manufacturing apparatus 1 having such a constitution.

First, the inside of the film formation chamber 2 is regulated to a desired vacuum by operating the vacuum pump 6 and the inside of the film formation chamber 2 is regulated to a desired temperature by a heater (not shown).

The evaporation source 3a is separately covered by the shutter 12. In this state, the evaporating section 3 is operated to sublimate an oriented film material.

Subsequently, if the sublimation rate of inorganic material of the evaporation source 3a is stablized, the gate valve 4a of the pre-processing chamber 4 is opened, the holding arm 10 is put into the pre-processing chamber 4 and the prepared substrate W is held by the holding member 11.

Figure 2A:
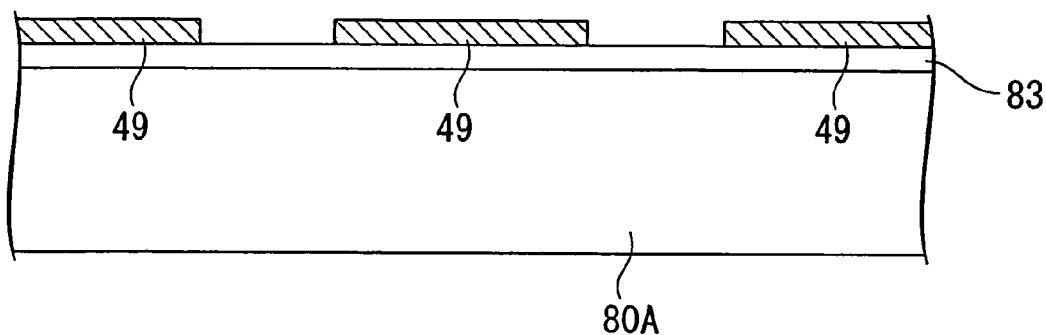
FIGS. 2A to 2C are cross-sectional views for describing the film forming of a base film and an oriented film.

As shown in FIG. 2A, as the substrate W prepared in the pre-processing chamber 4, a substrate having a substrate body 80A on which a laminated structure 83 including driving elements and wirings, etc. is formed, and pixel electrodes 49 is further formed, is used.

In such a substrate W, since the laminated structure 83 and pixel electrodes 49 are formed, a stepped portion is formed on the face of the substrate W on which the oriented film is formed.

Then, the holding arm 10 is again put into the film formation chamber 2 while holding the substrate W by the holding member 11, the substrate W is carried into the film formation chamber 2 and the gate valve 4a is closed.

The shutter 12 is moved to open the evaporation source 3a.

This being the case, the sublimated inorganic material diffuses radially upward from the evaporation source 3a.

On the other hand, if the holding arm 10 is moved to the base film formation area 13, the substrate W is lowered to approach the evaporation source 3a by operating the elevating mechanism and lowering the arm 10b.

Thus, the film forming rate of the inorganic material is increased, and the base film made of the inorganic material can be formed to a desired thickness, i.e., a thickness sufficiently thicker than an oriented film described later by moving the substrate W relative to the evaporation source 3a.

Thus, if the substrate W is lowered, the rotating mechanism is operated to rotate the substrate W.

Figure 2B:
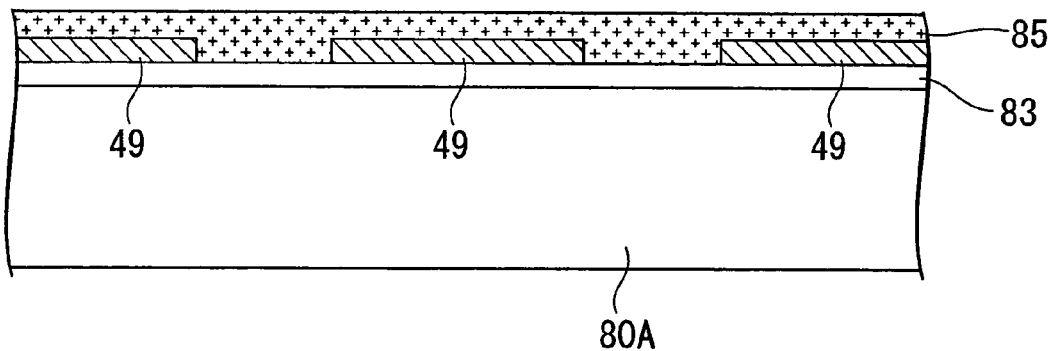

Thus, the substrate W is lowered to approach the evaporation source 3a, a base film 85 is formed, and the laminated structure 83 and pixel electrodes 49 are covered by the base film 85 as shown in FIG. 2B by allowing the holding arm 10 to stay in the base film formation area 13 for a pre-determined time while rotating in that state.

Here, the forming of the base film 85 eliminates almost all of the effect of the stepped portion formed by the laminated structure 83 and pixel electrodes 49 as shown in FIG. 2B and flattens the surface of the substrate W by fully thickening its thickness.

The traveling (movement) of the holding arms 10 to the rail 9 may be stopped at a pre-determined time, or the holding arm 10 may be continuously moved or intermittently moved at a low speed allowing the holding arms 10 to stay for a pre-determined time in the base film formation area 13.

In such a manner, if the base film 85 is formed at the substrate W, the gears and the arms 10b are reduced again by the elevating mechanism, and the substrate W is elevated.

The holding arm 10 travels (moves) in that state, and the substrate W is moved to the oriented film formation area 14.

In parallel, another holding arm 10 is similarly put into the above pre-processing chamber 4, the separately waiting substrate W is held by the holding members 11 and is further moved to the base film formation area 13.

During the movement of two such substrates W, the shutter 12 is operated to cover the evaporation source 3a.

Successively, the shutter 12 is opened, and the base film 85 is similarly formed as in the case of the former substrate W.

On the other hand, the substrate W formerly formed with the base film 85 arrives at the pre-determined position of the shielding plate 15.

The film forming surface of the substrate W is faced to the opening 16 by continuously or intermittently moving the holding arm 10 on the rail 9 in the oriented film formation area 14.

This being the case, the inorganic material sublimated from the evaporation source 3a is obliquely evaporated at a pre-determined angle to the film forming surface of the substrate W.

Then, the oriented film material can be obliquely evaporated over the surface of the film formation area (oriented film formation area) of the substrate W and a desired oriented film can be finally formed by performing such oblique evaporation while continuously or intermittently moving the substrate W relative to the opening 16.

Figure 2C:
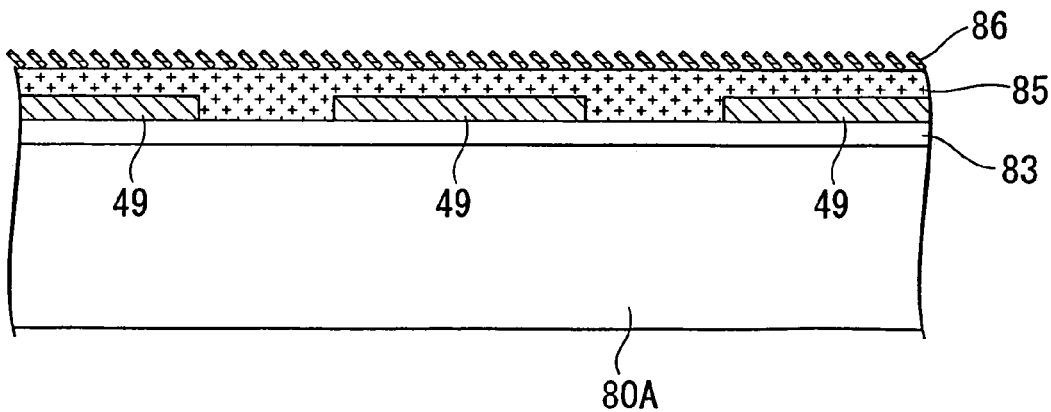

Therefore, an oriented film 86 can be formed on the base film 85 as shown in FIG. 2C.

In such a manner, if the base film 85 is formed on one substrate W in the base film formation area 13 and the oriented film 86 is further formed on another substrate W in the oriented film formation area 14 in parallel thereto, the holding arm 10 located in the oriented film formation area 14 is moved and the substrate W held by the holding arm 10 is carried to the post-processing chamber 5.

Then, the holding arm 10 is moved to the pre-processing chamber 4, and the awaited substrate W described above is held by the holding arm 10 in the pre-processing chamber 4. The substrate W held by the holding arm 10 is moved again to the base film formation area 13.

On the other hand, the holding arm 10 located in the base film formation area 13 is also similarly traveled (moved) as described above, and the substrate W on which the base film 85 is formed, is moved to the oriented film formation area 14.

The forming of the base film 85 and the forming of the oriented film 86 can be carried out in parallel and continuously for the substrate W by repeating the above described treatment.

In the manufacturing apparatus 1 having such a constitution, the forming of the base film 85 and the forming of the oriented film 86 can be carried out in parallel by the same evaporation source 3a for the substrates W differed from each other, because the manufacturing apparatus 1 has the base film formation area 13 and the oriented film formation area 14 in the same film formations chamber 2.

Furthermore, it is possible to suppress the formation of the stepped portion on the base portion of the oriented film 86 by forming the base film 85, and to eliminate the need to separately prepare an apparatus for the forming of the base film and an apparatus for the forming of the oriented film. Thereby, it is possible to reduce apparatus cost.

Furthermore, it is possible to eliminate the wastefulness of material sublimated from the evaporation source 3a and to enhance the usage efficiency of material because the forming of the base film 85 and the forming of the oriented film 86 can be carried out in parallel for different substrates W by the evaporation source 3a.

Accordingly, the production cost can be reduced much more than before.

In the manufacturing apparatus 1, it is possible to increase in the film forming rate of the base film 85, to fully thicken the thickness of the base film 85 and to enhance its function as a flattening film because an elevating mechanism is provided in the transporting section 8, the substrate W is lowered at the side of the base film formation area 13 and the distance from the evaporation source 3a to the substrate W can be narrowed.

Furthermore, it is possible to eliminate of irregularities of thickness and quality of the base film 85, thereby enhancing its function as a flattening film because a rotating mechanism is provided in the transporting section 8 and especially rotates the substrate W in the base film formation area 13.

The invention is not limited to this embodiment, and various modifications are possible to an extent that does not deviate from the invention.

Figure 3:
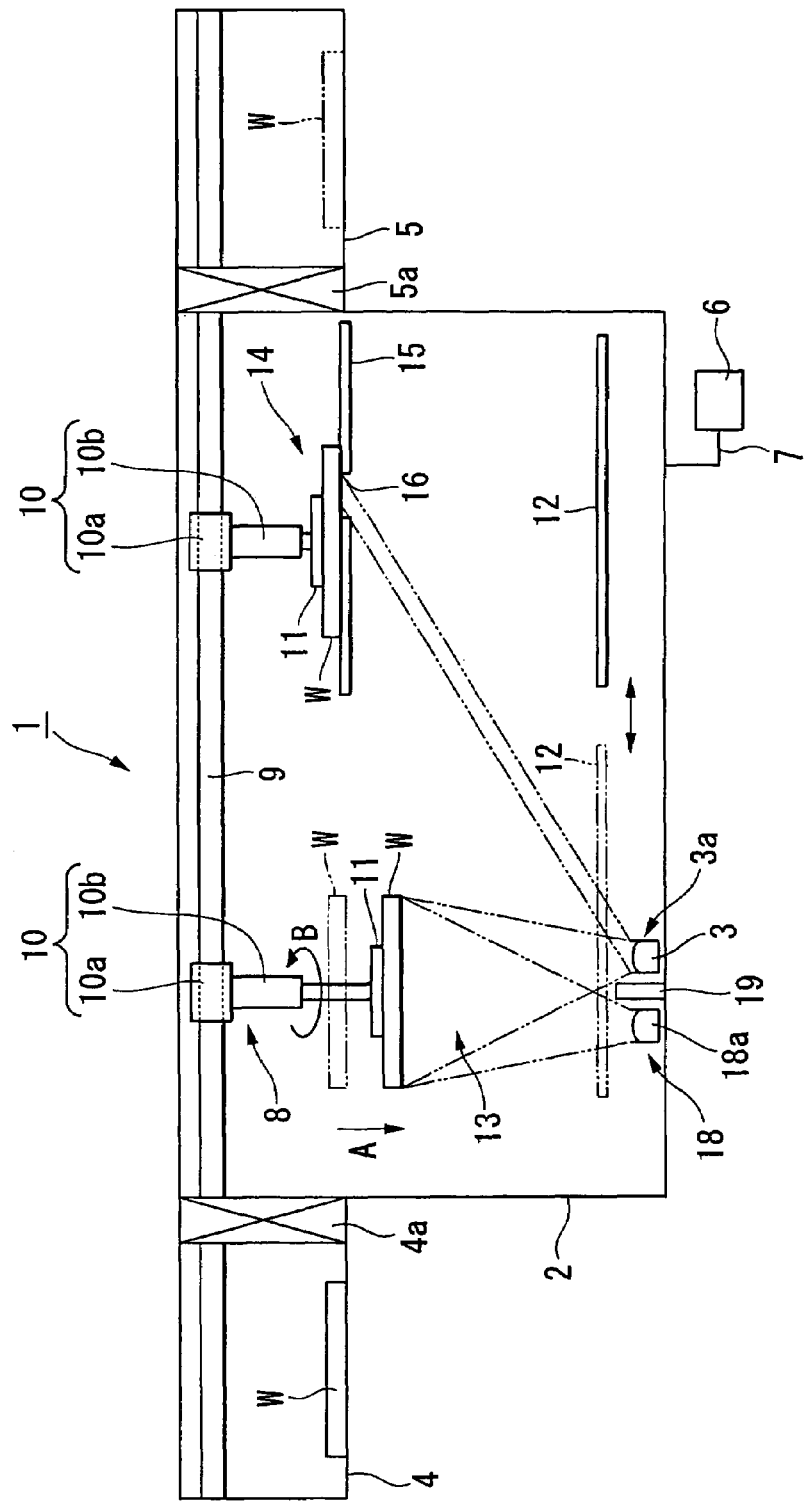
FIG. 3 is a schematic block diagram of another embodiment of the manufacturing apparatus of this invention.

For example, as shown in FIG. 3, a selectively evaporating section 18 is provided separately from the evaporating section 3, and a sublimate (evaporant) of inorganic material can be allowed to selectively flow from the evaporation source 18a of the selectively evaporating-section 18 only to the side of the base film formation area 13.

The selectively evaporating section 18 may have the same construction as the evaporating section 3.

In order to allow the sublimate (evaporant) to selectively flow from the selectively evaporating section 18 only to the side of the base film formation area 13, for example, a shielding plate 19 is arranged between the selectively evaporating section 18 and the opening 16 in the oriented film formation area 14 so as to shield the flow of the sublimate of the selectively evaporating section 18 to the opening 16.

Such a construction described above, it is possible to further increase in the film forming rate of the base film relative to the film forming rate of the oriented film, and to fully thicken the thickness of the base film 85 to enhance its function as a flattening film because the evaporation treatment is made by the selectively evaporating section 18 in addition to the evaporating section 3 in the base film formation area 13.

Next, a liquid crystal device of this invention provided with the base film and the oriented film formed by the manufacturing method based on such manufacturing apparatus 1 is described.

The scale of members is suitably changed to make the members recognizable sizes in the drawings used in the following description.

Figure 4:
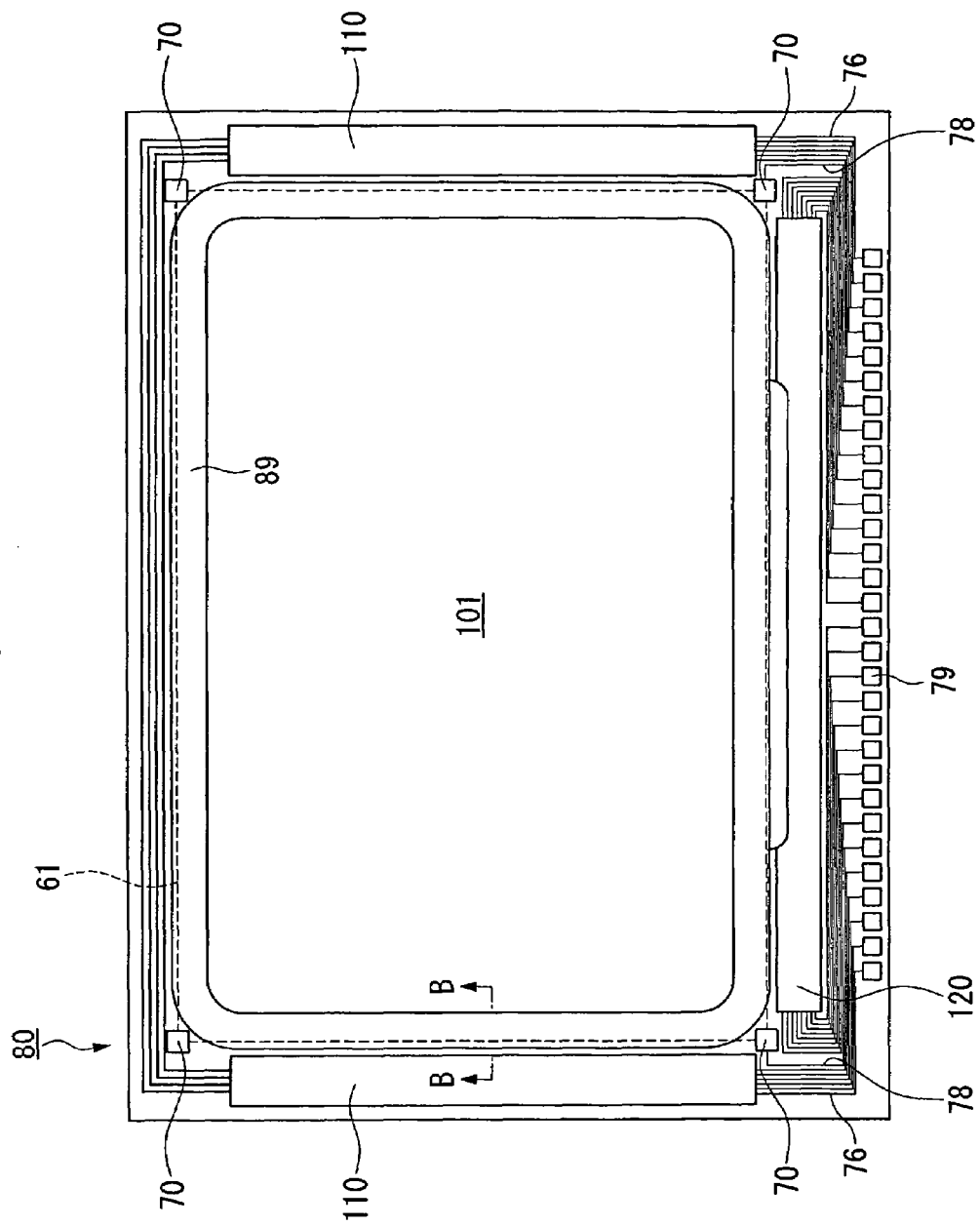
FIG. 4 is a plan view of a TFT array substrate of a liquid crystal device.

FIG. 4 is a plan view of a TFT array substrate showing a schematic constitution of an embodiment of the liquid crystal device of this invention.

Reference numeral 80 is the TFT array substrate in FIG. 4.

An image formation area 101 is formed at the center of the TFT array substrate 80.

A sealant 89 is arranged at the periphery of the image formation area 101, and a liquid crystal layer (not shown) is sealed in the image formation area 101.

The liquid crystal layer is formed by directly applying a liquid crystal onto the TFT array substrate 80, becoming a so-called seal-less structure in which an injection port of liquid crystal is not provided for the sealant 89.

Scanning line driving elements 110 for supplying a scanning signal to scanning lines described later and a data line driving element 120 for supplying an image signal to data lines described later are mounted to the outer side of the sealant 89.

Wirings 76 are drawn around from the driving elements 110 and 120 to connection terminals 79 of the end of the TFT array substrate 80.

On the other hand, a common electrode 61 (show in FIG. 7) is formed on a facing substrate 90.

This common electrode 61 is formed over nearly the entire image formation area 101, and conducting parts 70 between substrates 80 and 90 are formed at four corners thereof.

Wirings 78 are drawn from conduction parts 70 between substrates 80 and 90 to the connection terminals 79.

Then, the liquid crystal device is driven by supplying various signals input from the outside to the image formation area 101 via the connection terminals 79.

Figure 5:
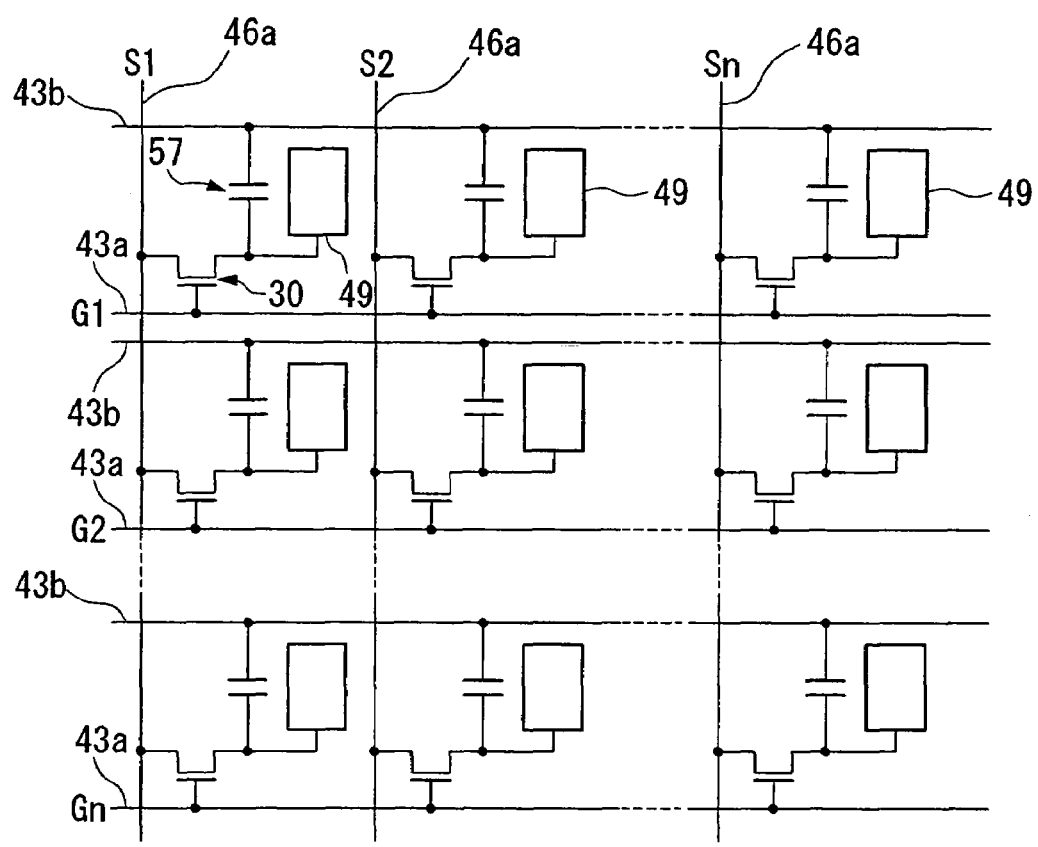
FIG. 5 is an equivalent circuit diagram of the liquid crystal device.

FIG. 5 is an equivalent circuit of the liquid crystal device.

Each of pixel electrodes 49 is formed in each of plurality of image elements arranged in an arrayed arrangement (matrix arrangement) which construct the image formation area 101 of a transmission-type liquid crystal device.

Moreover, TFT elements 30 including switch elements for performing control of energization of the pixel electrodes 49 are formed on the side portion of the pixel electrodes 49.

Data lines 46a are connected to sources of these TFT elements 30.

Image signals S1, S2, - - - , Sn are supplied from the above-mentioned data line driving element 120 to the each of data lines 46a.

Scanning lines 43a are connected to gates of the TFT elements 30.

Scanning signals G1, G2, - - - , Gm are supplied from the above-mentioned scanning line driving elements 110 to the each of scanning lines 43a in pulses at a predetermined timing.

On the other hand, the pixel electrodes 49 are connected to drains the of TFT elements 30.

If the TFT elements 30 including switch elements are turned ON only in a given period, the image signals S1, S2, - - - , Sn supplied from the data lines 46a are written in the liquid crystal of image elements at a predetermined timing via the pixel electrodes 49 by the scanning signals G1, G2, - - - , Gm supplied from the scanning lines 43a.

The image signals S1, S2, - - - , Sn at a pre-determined level written in the liquid crystal are held for a given period by liquid crystal capacities formed between the pixel electrodes 49 and the common electrode 61 described later.

Accumulative capacities 57 are formed between the pixel electrodes 49 and capacity lines 43b and are arranged in parallel to the liquid crystal capacities to prevent the held image signals S1, S2, - - - , Sn from leakage.

Thus, if a voltage signal is applied on the liquid crystal, the oriented state of liquid crystal molecules changes with the applied voltage level.

Thereby, light of the light source entering the liquid crystal is modulated to prepare light of an image.

Figure 6:
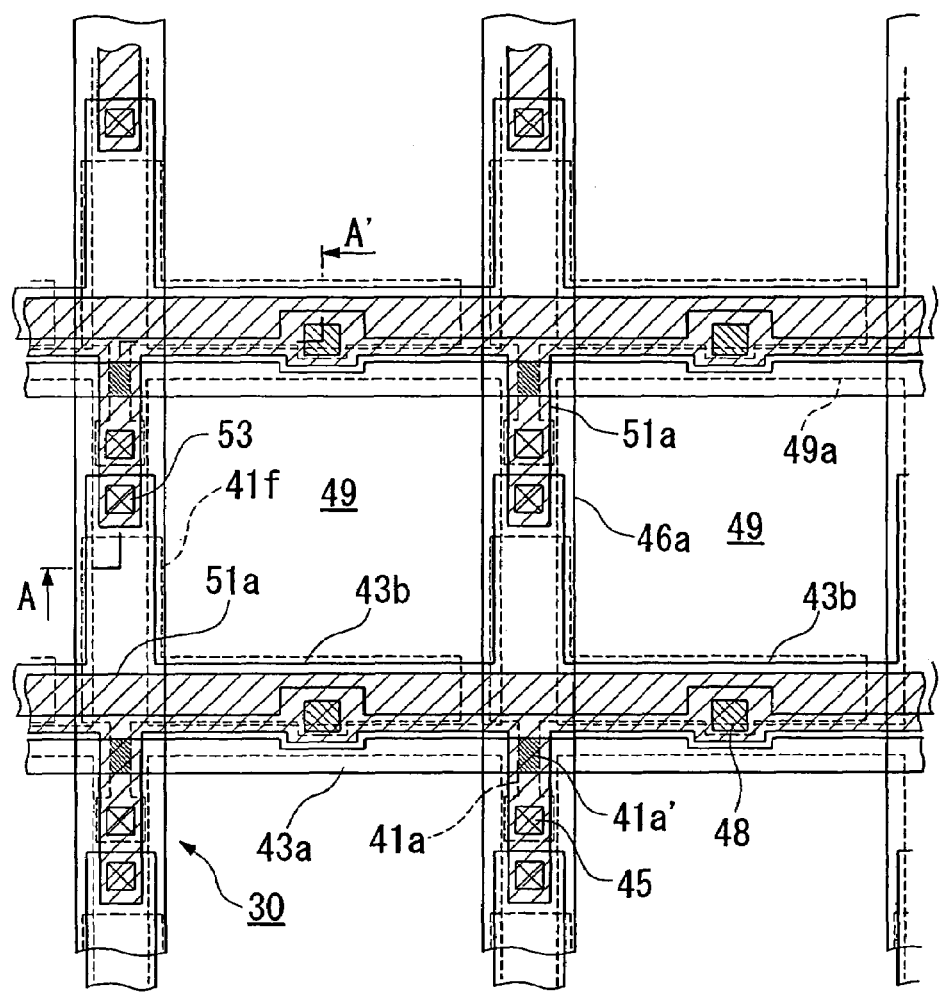
FIG. 6 is a plan view of a structure of the liquid crystal device for describing the liquid crystal device.

FIG. 6 is a plan view of the planar structure of the liquid crystal device.

In the liquid crystal device of this embodiment, rectangular pixel electrodes 49 (their contours are shown by broken lines 49a) made of a transparent conductive material, such as Indium Tin Oxide (called ITO hereafter), are arrayed in an arrayed arrangement (matrix arrangement) on a TFT array substrate.

The data lines 46a, scanning lines 43a and capacity lines 43b are provided along vertical and horizontal boundaries of the pixel electrodes 49.

In this embodiment, the rectangular area formed with the pixel electrodes 49 includes image elements and becomes a structure capable of performing a display for each dot arranged in an arrayed arrangement.

The TFT elements 30 are formed with a semiconductor layer 41a made of a polysilicon film, etc. as the center.

The data lines 46a are connected to a drain region (described later) of the semiconductor layer 41a via connector holes 45.

The pixel electrodes 49 are connected to a source region (described later) of the semiconductor layer 41a via connector holes 48.

On the other hand, a channel region 41a' is formed in a section faced to the scanning line 43a in the semiconductor layer 41a.

Figure 7:
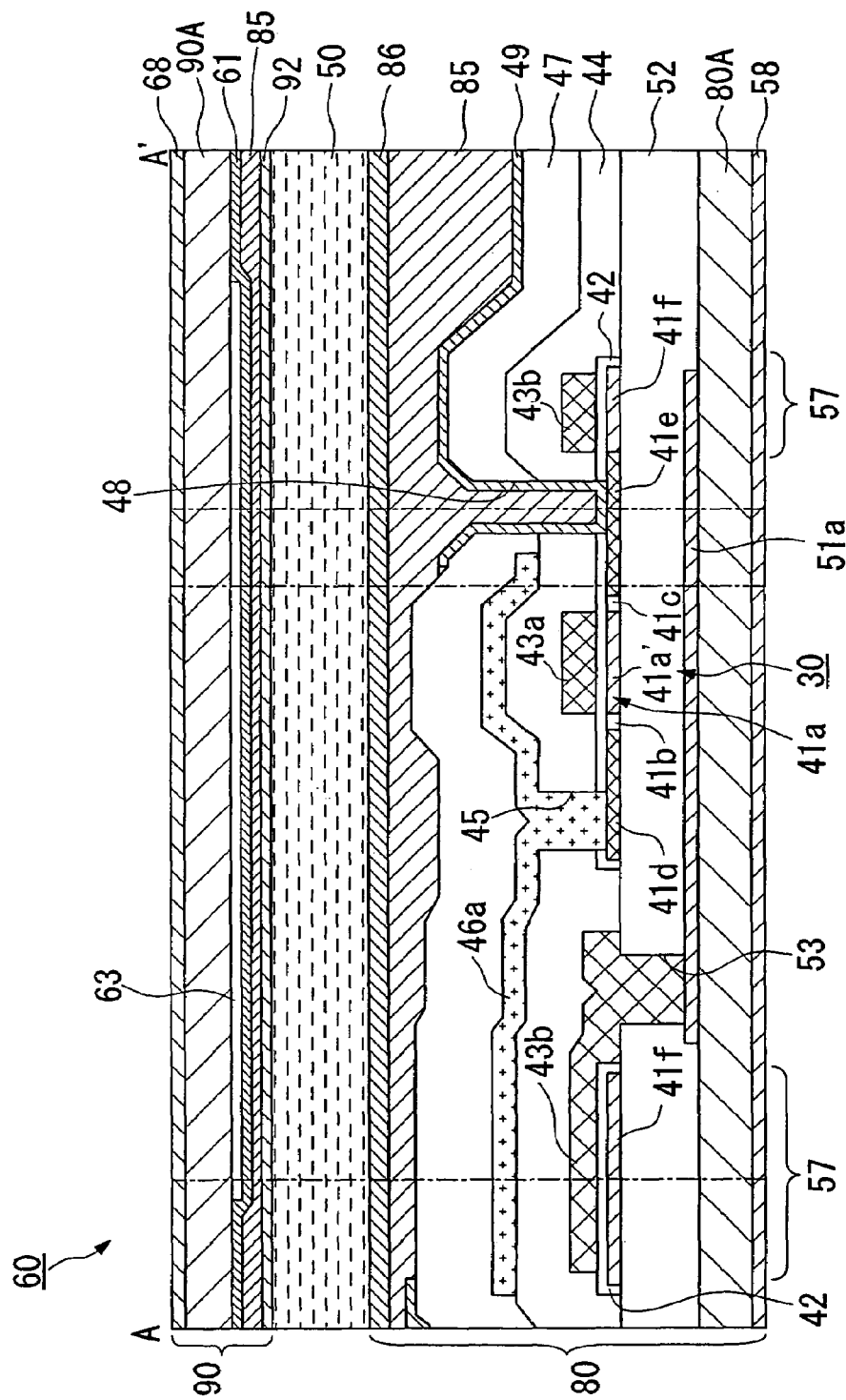
FIG. 7 is a cross-sectional view of a structure of the liquid crystal device for describing the liquid crystal device.

FIG. 7 is a cross-sectional view of a sectional structure of the liquid crystal device and is a cross-sectional view at an arrow line A-A' of FIG. 6.

As shown in FIG. 7, a liquid crystal device 60 of this embodiment is provided with a TFT array substrate 80, a facing substrate 90 arranged faced to the TFT array substrate 80, and a liquid crystal layer 50 held between the substrates 80 and 90 as the main body.

The TFT array substrate 80 is provided with the substrate body 80A made of a translucent material such as glass or quartz, the TFT element 30, the pixel electrode 49 formed at an inner side of the substrate body 80A, the base film 85 further covering the pixel electrode 49, the inorganic oriented film 86 covering the base film 85, etc. as the main body.

Here, the base film 85 and the oriented film 86 are formed on the TFT array substrate 80 (substrate body 80A) by the manufacturing apparatus 1, and the base film 85 especially functions as a flattening film.

On the other hand, the facing substrate 90 is provided with a substrate body 90A made of a translucent material such as glass or quartz, the common electrode 61 formed at an inner side of the substrate body 90A, the base film 85 further covering the common electrode 61, the inorganic oriented film 92 covering the base film 85, etc. as main body.

The base film 85 and the oriented film 92 are also formed by the manufacturing apparatus 1 on the facing substrate 90 (substrate body 90A).

A first shading film 51a and a first interlayer insulating film 52 described later are formed at the surface of the TFT array substrate 80.

Then, the semiconductor layer 41a is formed on the surface of the first interlayer insulating film 52, and the TFT element 30 is formed with this semiconductor layer 41a as the center.

The channel region 41a' is formed in a portion faced to the scanning line 43a at the semiconductor layer 41a, and a source region and a drain region are formed at both sides of the semiconductor layer 41a.

An LDD (Lightly-Doped Drain) structure is adopted in the TFT element 30, therefore a high-concentration region with a relatively high impurity concentration and a low-concentration region with a relatively low impurity concentration (LDD region) are formed in the source region and the drain region, respectively.

Therefore, a low-concentration source region 41b and a high-concentration source region 41d are formed in the source region, and a low-concentration drain region 41c and a high-concentration drain region 41e are formed in the drain region.

A gate insulating film 42 is formed on the surface of the semiconductor layer 41a.

Then, the scanning line 43a is formed on the surface of the gate insulating film 42, and a portion faced to the channel region 41a' is a gate electrode.

A second interlayer insulating film 44 is formed on the surface of the gate insulating film 42 and the scanning line 43a.

Then, the data line 46a is formed on the surface of the second interlayer insulating film 44, and the data line 46a is connected to the high-concentration source region 41d via a connection hole 45 formed on the second interlayer insulating film 44.

A third interlayer insulating film 47 is formed on the surface of the second interlayer insulating film 44 and on the data line 46a.

Then, the pixel electrode 49 is formed on the surface of the third interlayer insulating film 47, and the pixel electrodes 49 are connected to the high-concentration drain region 41d via a connection hole 48 formed in the second interlayer insulating film 44 and the third interlayer insulating film 47.

Moreover, the inorganic oriented film 86 covering the pixel electrode 49 and formed by the manufacturing apparatus 1 is formed on the pixel electrode 49, and can control the orientation of the liquid crystal molecules when applying a non-selective voltage.

In this embodiment, the semiconductor layer 41a is extended to form a first accumulative capacity electrode 41f.

The gate insulating film 42 is extended to form a dielectric film, and the capacity line 43b is arranged on the surface of the dielectric film to form a second accumulative capacity electrode.

The above-mentioned accumulative capacity 57 is constructed by the first accumulative capacity electrode 41f, the second accumulative capacity electrode (capacity line 43b), and the dielectric film (gate insulating film 42).

Furthermore, the first shading film 51a is formed on the surface of the substrate body 80A corresponding to a region forming the TFT element 30.

The first shading film 51a prevents light entering the liquid crystal device from entering into the channel region 41a', low-concentration source region 41b and low-concentration drain region 41c of the semiconductor layer 41a, etc.

On the other hand, a second shading film 63 is formed on the surface of the substrate body 90A in the facing substrate 90.

The second shading film 63 prevents light entering the liquid crystal device from entering into the channel region 41a', low-concentration source region 41b and low-concentration drain region 41c of the semiconductor layer 41a, etc., and is provided in a region overlapping with the semiconductor layer 41a in the plan view.

A common electrode 61 made of conductors such as ITO, etc. is formed over nearly the entire surface of the facing substrate 90.

Furthermore, an inorganic oriented film 92 formed by the manufacturing apparatus 1 is formed on the surface of the common electrode 61 and can control the orientation of liquid crystal molecules when applying a non-selective voltage.

Then, the liquid crystal layer 50 including of a nematic liquid crystal, etc. is held between the TFT array substrate 80 and the facing substrate 90.

These nematic liquid crystal molecules have a positive dielectric constant anisotropy, horizontally oriented along the substrate when applying a non-selective voltage, and vertically oriented along the direction of electric field when applying a selective voltage.

The nematic liquid crystal molecules have a positive index of refraction constant anisotropy, and a product of its birefringence and thickness of liquid crystal layer (retardation) $\Delta$And becomes, e.g., about 0.40 μm (60° C.).

The direction of orientation control based on the oriented film 86 of the TFT array substrate 80 and the direction of orientation control based on the oriented film 92 of the facing substrate 90 are set to a twisted state of about 90°.

Thereby, the liquid crystal device 60 of this embodiment is operated by a twisted nematic mode.

Polarizing plates 58 and 68 made of a material from doping iodine in polyvinyl alcohol (PVA), etc. are arranged at the outside of the two substrates 80 and 90.

It is desirable that the polarizing plates 58 and 68 be mounted on a support substrate made of a high-thermal conductivity material, such as sapphire glass or quartz, etc., and arranged apart from the liquid crystal device 60.

The polarizing plates 58 and 68 absorb linear polarization in the direction of its absorption axis and have a function of transmitting the linear polarization in the direction of its transmission axis.

The polarizing plate 58 arranged at the TFT array substrate 80 is so arranged so that its transmission axis is in substantially conformity to the direction of orientation control of the oriented film 86, and the polarizing plate 68 arranged at the facing substrate 90 is so arranged that its transmission axis is in substantially conformity to the direction of orientation control of the oriented film 92.

In the liquid crystal device 60, an outside of the facing substrate 90 is faced to the light source.

Only the linear polarization in conformity with the transmission axis of the polarizing plate 68 in the light of the light source transmits through the polarizing plate 68 and enters the liquid crystal device 60.

In the liquid crystal device 60 during the application of a non-selective voltage, the liquid crystal molecules oriented horizontally to the substrate are laminated and arranged in the form of a twisted helix of approximately 90° to the thickness direction of liquid crystal layer 50.

Therefore, the linear polarized light entering the liquid crystal device 60 exits the liquid crystal device 60 with a rotation of approximately 90°.

The linear polarized light transmits through the polarizing plate 58 because it is in conformity with the transmission axis of polarizing plate 58.

Accordingly, a white display is performed in the liquid crystal device 60 during the application of a non-selective voltage (normally white mode).

In the liquid crystal device 60 during the application of a selective voltage, the liquid crystal molecules are oriented vertically to the substrate.

Therefore, the linear polarized light entering the liquid crystal device 60 exits from the liquid crystal device 60 without rotation.

The linear polarized light does not transmit through the polarizing plate 58 because it is perpendicular to the transmission axis of polarizing plate 58.

Accordingly, a black display is performed in the liquid crystal device 60 during the application of a selective voltage.

Here, the inorganic oriented films 86 and 92 formed by the manufacturing apparatus 1 are formed on the inner side of both substrates 80 and 90 as described above.

The inorganic oriented films 86 and 92 are suitably made of silicon oxide such as $SiO_2$ or SiO as described above, but they may also be made of metal oxides such as $Al_2O_3$, ZnO, MgO or ITO, etc.

In the liquid crystal device 60 having such inorganic oriented films 86 and 92, the apparatus cost is reduced and the usage efficiency of materials is further enhanced especially for the forming of the base film 85 and the forming of the oriented films 86 and 92 as described above, with a conceivable reduction of manufacturing costs.

Technical problems caused by the formation of a stepped portion at the under portion of the oriented films 86 and 92 is also solved, with a conceivable improvement of quality.

Projector

Figure 8:
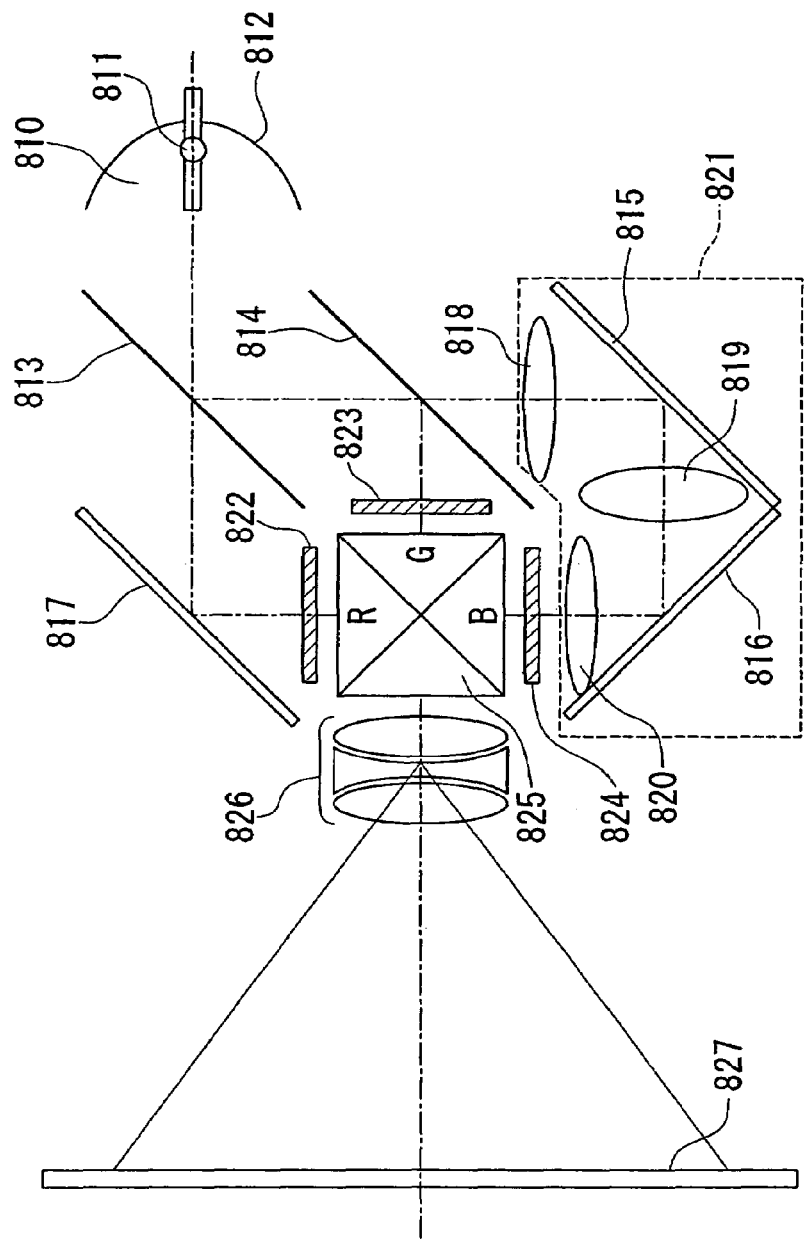
FIG. 8 is a schematic block diagram showing a projector.

An embodiment of a projector as the electronic device of this invention is described hereafter with reference to FIG. 8.

FIG. 8 is a schematic block diagram showing the projector.

The projector is provided with the liquid crystal device relating to aforesaid embodiment as a photo-modulation section.

In FIG. 8, reference numeral 810 is a light source, reference numerals 813 and 814 are dichromic mirrors, reference numerals 815, 816 and 817 are reflecting mirrors, reference numeral 818 is an entrance lens, reference numeral 819 is a relay lens, reference numeral 829 is an exit lens, reference numerals 822, 823 and 824 are photo-modulation section consisting of the liquid crystal device of invention, reference numeral 825 is a cross dichromic prism, and reference numeral 826 is a projection lens.

The light source 810 includes a lamp 811 such as a metal halide lamp, etc. and a reflector 812 for reflecting light of the lamp.

The dichromic mirror 813 transmits red light contained in white light radiated from the light source 810 and reflects blue light and green light.

The transmitted red light is reflected by the reflecting mirror 817 and enters the photo-modulation section 822 for red light.

The green light reflected by the dichromic mirror 813 is reflected by the dichromic mirror 814 and enters the photo-modulation section 823 for green light.

The blue light is reflected by the dichromic mirror 813 and transmited through the dichromic mirror 814.

A light-guiding section 821 provided with a relay lens system including the entrance lens 818, relay lens 819 and exit lens 820 is provided to prevent light loss due to a long optical path for blue light.

The blue light enters the photo-modulation section 824 for blue light.

The three color lights modulated by the photo-modulation section 822, 823 and 824 enter the cross dichromatic prism 825.

The cross dichromic prism 825 is formed by pasting four right-angle prisms.

A dielectric multi-layer film for reflecting red light and a dielectric multi-layer film for reflecting blue light are formed in the shape of X and on a boundary face of the prisms.

The three color lights are synthesized by the dielectric multi-layer films to form light expressing a color image.

The synthesized light is projected on a screen 827 by a projection lens 826 including the projection optical system.

The above-mentioned projector is provided with a liquid crystal device as the photo-modulation section.

The liquid crystal device is provided with inorganic oriented films excellent in light resistance and heat resistance as described above.

Therefore, the oriented films do not deteriorate due to strong light radiated from a light source or heat.

The liquid crystal device reduces manufacturing costs and improves quality, therefore the projector (electronic device) itself also reduces manufacturing costs and improves quality.

The technical scope of invention is not limited to the above-mentioned embodiment, and embodiments added with various modifications to the above-mentioned embodiment are also included within parameters which do not deviate from the purpose of the invention.

For example, the liquid crystal device provided with TFT as switching elements was described as an example in the embodiment, but this invention is also applied to a liquid crystal device provided with two-terminal elements, such as thin film diodes, etc. as switching elements.

A transmission-type liquid crystal device was described as an example in the embodiment, but it is also possible to apply this invention to a reflection-type liquid crystal device.

A liquid crystal device functioning by TN (Twisted Nematic) mode was described as an example in the embodiment, but it is also possible to apply this invention to a liquid crystal device functioning by VA (Vertical Alignment) mode.

A three-plate type projection display device was described as an example in the embodiment, but it is also possible to apply this invention to a single-plate type projection display device or a direct-view display device.

It is also possible to apply this invention to electronic device other than the projector.

A portable telephone can be given as a specific example thereof.

The portable telephone is provided with a liquid crystal device relating to the above-mentioned embodiments or their modified examples in the display unit. As other electronic device, for example, IC card, video camera, PC computer, head-mount display, moreover, fax device with display function, finder of a digital camera, portable-TV, DSP device, PDA, electronic notebook, electric light notice board, display for propagation and announcement, etc. are given.

What is claimed is:

1. A manufacturing apparatus for a liquid crystal device having a pair of substrates facing each other, an oriented film formed on a facing surface of at least one substrate in the pair of the substrates, and a liquid crystal held between the pair of substrates, comprising:

a film formation chamber;

a first evaporation section located in the film formation chamber and having a first evaporation source, the first evaporation section evaporating a first inorganic material from the first evaporation source by physical vapor deposition to provide a first evaporant on the at least one substrate in the film formation chamber;

a second evaporation section located in the film formation chamber and having a second evaporation source, the second evaporation source being adjacent to the first evaporation source, the second evaporation section evaporating a second inorganic material from the second evaporation source by physical vapor deposition to provide a second evaporant on the at least one substrate in the film formation chamber;

a base film formation area in the film formation chamber, the base film formation area being located substantially above the first and second evaporation sources in the film formation chamber;

an oriented film formation area in the film formation chamber, the oriented film formation area being located obliquely above the first and second evaporation sources in the film formation chamber;

a transporting section holding and transporting the at least one substrate in a substantially linear lateral direction through the film formation chamber, the transporting section having:

an elevating mechanism which lowers the at least one substrate to a lowered position so as to approach the first and second evaporation sources, and elevates the at least one substrate from the lowered position, while holding the at least one substrate in the base film formation area, and a rotating mechanism which rotates the at least one substrate for one rotation within a plane parallel to the facing surface of the at least one substrate while holding the at least one substrate in the base film formation area, the rotation being performed about an axis passing through a substantial center of the at least one substrate;

a first shielding plate in the oriented film formation area, the first shielding plate being oriented substantially parallel to the facing surface of the at least one substrate and having an elongated opening therein, the elongated opening having a side oriented perpendicular to the substantially linear lateral direction and exposing less than an entirety of the facing surface of the at least one substrate to the first evaporant source; and a second shielding plate oriented substantially perpendicular to the facing surface of the at least one substrate and being arranged between the first and second evaporation sources, the second shielding plate preventing the second evaporant from flowing through the elongated opening in the first shielding plate to reach the at least one substrate while the at least one substrate is in the oriented film formation area, wherein the first and second evaporants form a base film on the at least one substrate while the at least one substrate is in the base film formation area, and only the first evaporant forms an oriented film on the base film while the at least one substrate is in the oriented film formation area.

* * * * *